United States Patent [19]

Chern et al.

[11] 4,401,537
[45] Aug. 30, 1983

[54] LIQUID CRYSTAL DISPLAY AND PHOTOPOLYMERIZABLE SEALANT THEREFOR

[75] Inventors: Mao-Jin Chern, Rancho Palos Verdes, Calif.; Robert D. Lowrey, Aitkin, Minn.

[73] Assignee: Minnesota Mining and Manufacturing Company, St. Paul, Minn.

[21] Appl. No.: 280,108

[22] Filed: Jul. 2, 1981

Related U.S. Application Data

[63] Continuation-in-part of Ser. No. 973,149, Dec. 26, 1978, Pat. No. 4,297,401.

[51] Int. Cl.³ .............................................. C09K 3/34
[52] U.S. Cl. ........................... 204/159.11; 204/159.13; 428/1
[58] Field of Search ..................... 204/159.11, 159.13; 428/1

[56] References Cited

U.S. PATENT DOCUMENTS

| | | | |
|---|---|---|---|
| 3,702,783 | 11/1972 | Hartlein | 428/447 |
| 3,871,746 | 3/1975 | Muto | 350/160 LC |
| 3,990,781 | 11/1976 | Gum | 350/160 LC |
| 4,007,077 | 2/1977 | Yaguchi | 428/1 |
| 4,037,930 | 7/1977 | Matsuyama | 350/160 LC |
| 4,101,513 | 7/1978 | Fox | 526/193 |

FOREIGN PATENT DOCUMENTS 1485658  9/1977  United Kingdom ............. 428/1

Primary Examiner—Marion McCamish
Attorney, Agent, or Firm—Cruzan Alexander; Donald M. Sell; Jennie G. Boeder

[57] ABSTRACT

A composition comprising a photopolymerizable epoxy-containing material which is useful to provide a hermetically sealed liquid crystal display cell. The photocured seal is chemically resistant to the contents of the liquid crystal cell. Adhesion of the photopolymerizable epoxy material to the glass plates of the liquid crystal cell is improved by addition of glycidoxypropyl triethoxy silane or its precondensate.

7 Claims, 3 Drawing Figures

LIQUID CRYSTAL DISPLAY AND PHOTOPOLYMERIZABLE SEALANT THEREFOR

This application is a continuation-in-part of copending application Ser. No. 973,149, filed Dec. 26, 1978, now U.S. Pat. No. 4,297,401.

This invention relates to an improved liquid crystal display cell, the method of making such a cell and the components used therefor. More particularly, the invention relates to a composition and method of fabricating a radiation curable epoxy resin seal for liquid crystal display cell wherein such photocured seal has the advantages of being transparent, hermetic, and relatively chemically inert to the liquid crystal materials utilized in display cells.

Liquid crystal display cells presently known in the art are generally constructed of a pair of spaced apart glass plates having transparent electrodes on the facing surfaces thereof. The plates or half-cells are bonded together by a seal material about the periphery of the plates. The inward volume defind by the sealant material and the plates is adapted to be filled with and confine a thin film of liquid crystal material which, when selectively addressed by voltages applied to the transparent electrodes, varies the optical states of the liquid crystal material to define a display image.

The life of a liquid crystal display cell is partially dependent upon the quality of the seal between plates. Most known liquid crystal materials are susceptible to attack by various contaminants. Atmospheric contaminants may gain entry to the cell either at the time of manufacture, or they may contaminate the cell gradually by permeating the seal of the cell. Another source of contaminants is the seal material itself.

A further problem is presented by the fact that most conventional liquid crystal sealant materials require high temperatures or pressures to cure which may cause warpage or fracture of the glass. Additionally, in cell designs where treatment of the glass plates is necessary to obtain alignment of the liquid crystal materials within the cell, high temperature sealing tends to efface the alignment.

The prior art teaches the use of organic and inorganic sealant materials for use in liquid crystal display cells. Room temperature setting organic sealing materials such as epoxies and urethanes, have not performed successfully as sealants for liquid crystal cells since they tend to deteriorate under conditions of moderate or high humidity. Another problem is presented by the fact that liquid crystal materials are effective solvents for many of such organic sealing materials, causing contamination of the liquid crystal materials and reducing the useful life of the display cell.

Organic heat sealing films of nylon, epoxy, butyral, or polyethylene also are not effective sealants for liquid crystal cells since they have high moisture permeability and allow bubbles to form in the liquid crystal cell over a sustained period of time, thereby resulting in deterioration of the liquid crystal material.

U.S. Pat. No. 3,871,746 discloses the use of liquid crystal sealant made of a tetrafluoroethylene-ethylene-copolymer or of a chlorotrifluoroethylene-ethylene-copolymer. These copolymers are said to exhibit no reactivity with the liquid crystal materials and low moisture permeability. However, these sealing agents also require heating between the range of 240° and 260° C., thus creating thermal stress which may result in warpage or fracture of the glass and disruption of alignment as cited above.

U.S. Pat. No. 3,990,781, teaches bonding liquid crystal display cells together with a dispersion of fluorocarbon and an organosilane coupling agent. The organic sealant is said to be relatively chemically inert to the liquid crystal material. Again, however, to seal, the plates are heated at 600° F. for 75 seconds and then processed at 500° F. for 15 minutes. Heating at these temperatures could cause disruption of alignment, and warpage or fracture of the glass.

Inorganic sealing materials such as low-melting glass frits and metal solders have greater resistance to the liquid crystal material than heretofore known organic sealants. However, inorganic sealants complicate the sealing operation. Such sealants are difficult to work with, often requiring sealing at high temperatures (between 450° C. and 500° C.) with precise control of the heating profile. Warpage and fracture of the glass plates can result as well as disruption of alignment of the liquid crystal material.

The liquid crystal cells of the present invention overcome the deficiencies of the prior art by providing chemically, electrically and mechanically stable liquid crystal cells having a photocurable organic sealant which is chemically resistant to the contents of the liquid crystal cell and which exhibits excellent adhesion to substrates.

One aspect of the present invention relates to improved single and multi-cavity cells employing a photopolymerized epoxy sealant.

Another aspect of the invention relates to a method of making the improved cells.

Yet another aspect of the invention relates to unique photopolymerizable epoxy-containing sealant materials which can be used to fabricate the cells described herein.

The sealant compositions useful in the present invention comprise organic epoxy-containing materials which are cationically polymerizable and certain photosensitive aromatic onium salts or photoinitiators, with an optional adhesion additive comprising glycidoxypropyl triethoxy silane or its precondensate, glycidoxypropyl triethoxy silane heated with dilute hydrochloric acid. These sealants, alone or in combination with the disclosed silane adhesion additives, result in strong sealant bonds to the glass plates of liquid crystal display cells after photopolymerization. The photopolymerizable sealant mixtures of the present invention exhibit excellent resistance to liquid crystal materials and have low moisture permeability.

An important feature of the present invention is that the photopolymerizable sealants are sensitive throughout the ultraviolet and visible spectral regions and photocure rapidly, without use of heat, to polymers having desirable sealant properties. The sealants can be rapidly and completely cured in thin or thick sections. The uniformity and thickness of the sealant can be more easily controlled by the practice of the present invention since heat curing, which reduces the viscosity of the sealant and causes the sealant to run in a nonuniform manner, can be eliminated.

The present invention provides stable sealant compositions and displays having good shelf life and thermal stability. Consequently, if desired, the compositions and displays can be used under conditions of high temperature.

The advantageous properties of the liquid crystal displays of the present invention is particularly surprising in view of the problems encountered in the use of previously known organic sealant materials as discussed hereinabove. Room temperature curing epoxy resins do not result in satisfactory liquid crystal display cells due to the fact that these resins dissolve in the contents of the liquid cell and are permeable to moisture. Thus, it is unexpected that epoxy-containing resins when photocured would be highly resistant to the contents of the liquid crystal cell and impermeable to moisture, thereby providing a superior liquid crystal display cell. Further, the present inventors have found that other organic materials, e.g., acrylates and urethanes, which they have rendered photopolymerizable by the appropriate photoinitiators and applied as sealants in liquid crystal display cells degrade within one week after storage at room temperature. Degradation results from the reactivity of liquid crystal materials with acrylates and urethanes and causes the orientation of the liquid crystals to be destroyed.

However, when liquid crystal display cells are sealed with the photopolymerizable epoxy-containing resins of the present invention one realizes dual advantages; the cell is easily cured and processed, and the contents of the cell are less susceptible to contamination and the resulting reduction in life time.

BRIEF DESCRIPTION OF THE DRAWING

In the drawing:

Referring now to FIGS. 1, 2 and 3, a preferred embodiment of the invention comprises a liquid crystal display cell including corresponding front and back plates of half-cells 9, 11 respectively formed of planar glass plates. Plates 9 and 11 are spaced apart a small distance to form a cavity or compartment for confining liquid crystal material 23 within the display cell.

The liquid crystal cell plates can be made of any suitable inorganic material such as glass, ceramics, or metal, or any suitable organic materials selected from the broad group of plastic materials. The front cell plate is usually a transparent material such as glass, and the back plate can be either transparent or opaque.

Transparent conductive electrodes in various patterns, represented by 13, are formed on the inner surfaces of plates 9 and 11 by techniques well known in the art. Conductive leads 27 extend from electrode patterns 13, to the exterior of the cell plates and suitable electrical connections can be made thereto in order to apply voltage to the cell for operation thereof.

Glass plates 9 and 11 are then coated as step 2, with the proper alignment coating 15, such as SiO or a fluorocarbon, by conventional techniques such as vapor deposition or the like.

Figure 2:
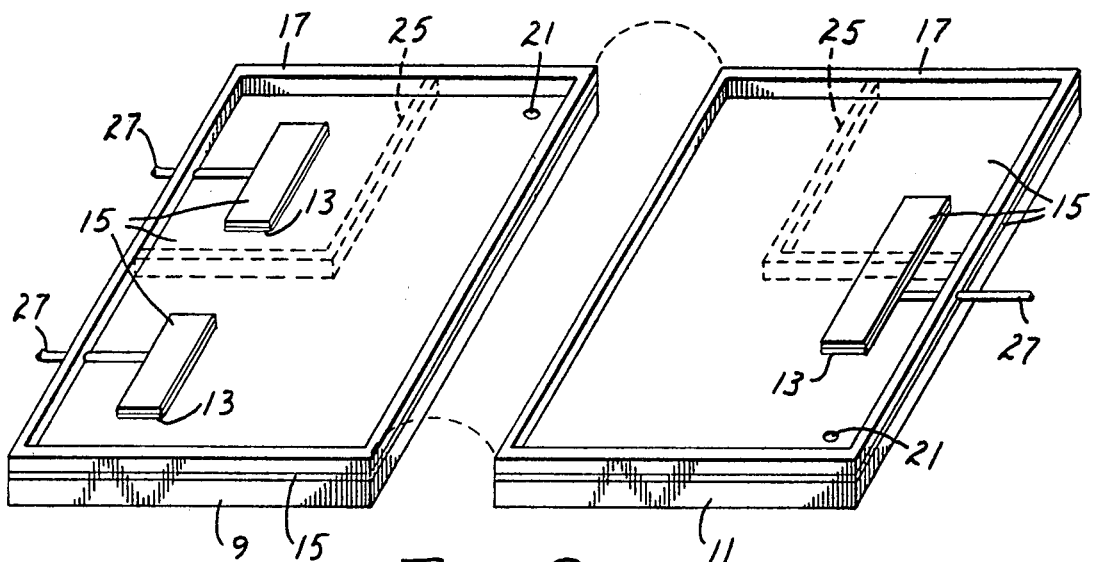
FIG. 2 shows an exploded view of one embodiment of the invention with the uppermost piece being inverted to show its understructure.

Step 3 is the application of the photopolymerizable epoxy sealant 17 to one or both glass plates 9, 11, in a desired pattern. Generally a silkscreen technique is employed although other application methods may be employed such as brushing, spraying, dipping, roll coating, flow coating or the like. As indicated in FIG. 2, the sealant 17 can be applied to form a single cavity or compartment for the liquid crystal display material or alternatively, the sealant 25 can be applied to produce a multi-cavity or multi-compartment construction. When the glass plates contain fill holes such as shown at 21 the sealant can define a continuous cavity periphery. Alternatively, fill holes such as 17 can be provided in the sealant and later plugged.

The preferred method of applying the sealant to the glass plates is by silk screening. Fillers such as fumed $SiO_2$ sold under the trade name "Cab-O-Sil" by the Cabot Co., can be added to the photopolymerizable epoxy-containing sealant to alter the viscosity for easy screen printing. An amount of 4–8% filler is acceptable with best results being obtained when 5–6% filler is used.

Figure 3:
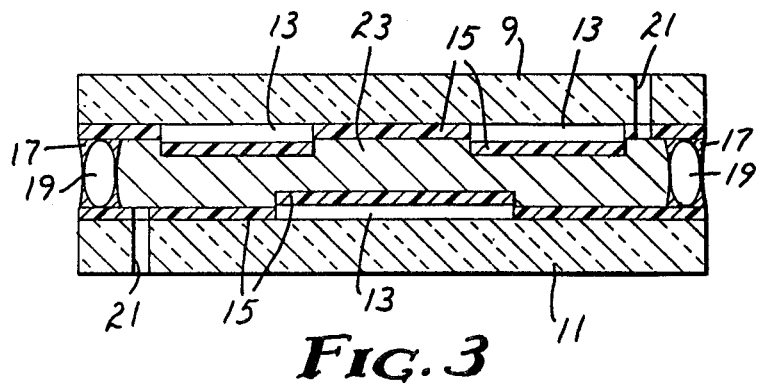
FIG. 3 is a cross section of one embodiment of the present invention.

In order to uniformly maintain the distance between the plates of the liquid crystal cell at a predetermined thickness, a spacing element is preferably placed between the plates. As shown in FIG. 3 a spacing element, such as glass bead 19, can be incorporated into the sealant material if desired.

By carefully selecting the amount of epoxy resin and the thickness of the spacing element, any desired spacing between the plates of the cell can be achieved. The spacing element incorporated in the cell with the epoxy resin of this invention can be any suitable granular element such as glass beads made of soda-lime-silicate, ceramic beads made of alumina, metal balls, plastic beads, glass fibers, metallic fibers, whiskers and other fibrous elements, fine ceramic fragments and the like. Optimum results are obtained when granular elements are used, especially glass beads or ceramic beads. A sufficient amount of the spacing element should be used to provide uniform spacing without employing such excessive amounts that bond strength is weakened. 1–8% by weight of the sealant and preferably about 4–6% glass beads give satisfactory results.

In step 4, the inner surfaces of the two glass plates 9 and 11, are sealed one to the other in order to form the whole liquid crystal display cell.

Figure 1:
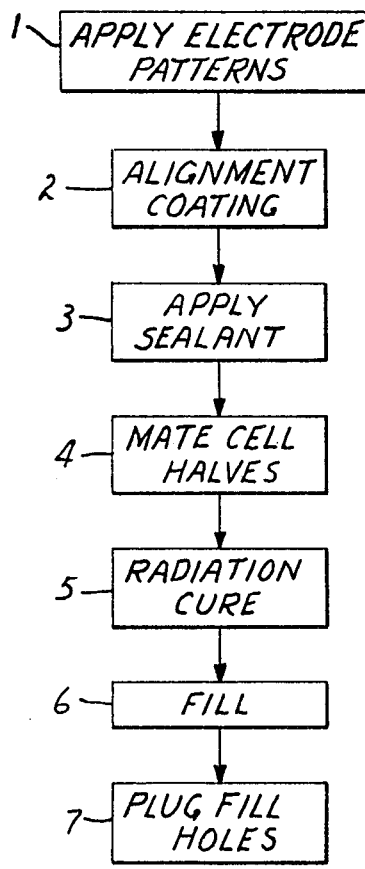
FIG. 1 is a schematic drawing of the steps in producing a liquid crystal display cell in accordance with the present invention.

After the sealant has been applied to the glass plates, the two cell halves are mated and radiation cured as shown in FIG. 1, step 5. The cured sealant 17, 25 holds glass plates 9 and 11 together and forms a resistant gasket for containing liquid crystal material 23.

The photopolymerization and curing of the compositions of the invention occurs on exposure of the sealant composition to any source of radiation emitting actinic radiation at a wavelength within the ultraviolet and visible range of the spectrum in which the photocatalyst will absorb. Suitable sources of radiation include mercury, xenon, carbon arc and tungsten filament lamps, sunlight, etc. Exposures may be less than one second to ten minutes or more depending upon the amounts of particular polymerizable epoxy resin materials and photocatalytic onium salt being utilized and upon the radiation source, distance from the source, and the thickness of the material being polymerized. The composition may also be polymerized by exposure to electron beam irradiation. By use of electron beam irradiation, highly filled compositions can be effectively cured at a faster rate than by exposure to actinic radiation.

The polymerization or curing of the composition is a triggered reaction, i.e., once degradation of the photocatalytic onium salt has been initiated by exposure to radiation, the polymerization or curing proceeds and will continue even after terminating radiation. The use of thermal energy during or after exposure to radiation greatly accelerates polymerization or curing, although the disadvantages of applying heat to liquid crystal display cells is explained above. It has been found that a thermal treatment, e.g., 100°-130° C. for 15 minutes, after radiation curing, but before filling the cell, further improves the stability of the cured sealant.

The cured cell can now be filled with liquid crystal materials 23, step 6. Exemplary of the known liquid crystal materials which can be used in the practice of this invention are schiff bases, such as MBBA and EBBA, phenyl cyclohexanes, biphenyl cyclohexanes, cyanobiphenyls, azoxy compounds, aromatic esters, cholesteric liquid crystal compounds and mixtures of one or more such compounds.

Lastly, the fill holes 21 in the glass plates 9 and 11 or in the sealant itself 17, are plugged, step 7. The preferred plugging material is the photopolymerizable epoxy resin sealant of the present invention which requires that the liquid crystal cell be exposed to radiation after plugging, in order to cure the plug. However, any conventional hermetic plugging material, such as metal solder (e.g., indium), low melting point glass or organic resins can be used.

As noted hereinabove, the photocurable sealant compositions of the present invention comprise an organic epoxy containing material which is cationically photopolymerizable and a photosensitive aromatic onium salt together with other fillers, pigments, stabilizers etc. as desired. These components are described in greater detail hereinafter.

Epoxy-containing materials useful in the sealant compositions of the invention are the organic compounds having an oxirane ring polymerizable by ring opening. Such materials, broadly called epoxies, include monomeric epoxy compounds and epoxides of the polymeric type and can be aliphatic, cycloaliphatic, aromatic or heterocyclic. These materials generally have at least one polymerizable epoxy group per molecule (preferably two or more epoxy groups per molecule) however, in the polymeric type there are many pendant epoxy groups (e.g., a glycidyl methacrylate polymer could have several thousand pendant epoxy groups per average molecular weight.

These epoxy-containing materials may vary from low molecular weight monomeric materials to high molecular weight polymers and may vary greatly in the nature of their backbone and substituent groups. For example, the backbone may be of any type and substituent groups thereon can be any group not having an active hydrogen atom which is reactive with an oxirane ring. Illustrative of permissible substituent groups are halogens, ester groups, ethers, sulfonate groups, siloxane groups, nitro groups, amide groups, nitrile groups, phosphate groups, etc. The molecular weight of the epoxy-containing materials may vary from 58 to about 100,000 or more. Mixtures of various epoxy-containing materials can also be used in the compositions of this invention.

Useful epoxy-containing materials are well known and include such epoxides as epichlorohydrins, e.g., epichlorohydrin; alkylene oxides, e.g., propylene oxide, styrene oxide; alkenyl oxides, e.g., butadiene oxide; glycidyl esters, glycidyl-type epoxy resins, e.g., the diglycidyl ethers of Bisphenol A and of novolak resins, such as described in "Handbook of Epoxy Resins" by Lee and Neville, McGraw-Hill Book Co., New York (1967).

Other useful epoxy-containing materials are those which contain one or more cyclohexene oxide groups such as the epoxycyclohexanecarboxylates, typified by 3,4-epoxycyclohexylmethyl-3,4-epoxycyclohexanecarboxylate, 3,4-epoxy-2-methylcyclohexylmethyl-3,4-epoxy-2-methylcyclohexane carboxylate, and bis (3,4-epoxy-6-methylcyclohexylmethyl) adipate. For a more detailed list of useful epoxides of this nature, reference is made to the U.S. Pat. No. 3,117,099, incorporated herein by reference.

Further epoxy-containing materials which are particularly useful in the practice of this invention include glycidyl ether monomers of the formula

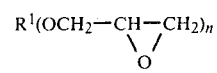

where $R^1$ is alkyl or aryl and n is an integer of 1 to 6. Examples are the glycidyl ethers of polyhydric phenols obtained by reacting a polyhydric phenol with an excess of chlorohydrin such as epichlorohydrin (e.g., 2,2-bis-4(2,3-epoxy)propoxyphenyl propane). Further examples of epoxides of this type which can be used in the practice of this invention are described in U.S. Pat. No. 3,018,262, incorporated herein by reference.

There are a host of commercially available epoxy-containing materials which can be used in this invention. In particular, epoxides which are readily available include propylene oxide, epichlorohydrin, styrene oxide, vinyl cyclohexene oxide, glycidol, glycidyl methacrylate, diglycidyl ether of Bisphenol A (e.g., those available under the trade designations "Epon 828," "Epon 1004" and "Epon 1010" from Shell Chemical Co., "DER-331," "DER-332," and "DER-334," from Dow Chemical Co.), vinylcyclohexene dioxide (e.g., "ERL-4206" from Union Carbide Corp.), 3,4-epoxycyclohexylmethyl-3,4-epoxycyclohexene carboxylate (e.g., "ERL-4221" from Union Carbide Corp.), 3,4-epoxy-6-methylcyclohexylmethyl-3,4-epoxy-6-methylcyclohexene carboxylate (e.g., "ERL-4201" from Union Carbide Corp.), bis (3,4-epoxy-6-methylcyclohexylmethyl) adipate (e.g., "ERL-4289" from Union Carbide Corp.), bis (2,3-epoxycyclopentyl) ether e.g., "ERL-0400" from Union Carbide Corp.), aliphatic epoxy modified with polypropylene glycol (e.g., "ERL-4050" and "ERL-4052" from Union Carbide Corp.), dipentene dioxide (e.g., "ERL-4269" from Union Carbide Corp.), epoxidized polybutadiene (e.g., "Oxiron 2001" from FMC Corp.), silicone resin containing epoxy functionality, flame retardant epoxy resins (e.g., "DER-580," a brominated bisphenol type epoxy resin available from Dow Chemical Co.), 1,4-butanediol diglycidyl ether (e.g., "Araldite RD-2" from Ciba-Geigy), polyglycidyl ether of phenolformaldehyde novolak (e.g., "DEN-431" and "DEN-438" from Dow Chemical Co.), and resorcinol diglycidyl ether (e.g., "Kopoxite" from Koppers Company, Inc.).

Other epoxy-containing materials are copolymers of acrylic acid esters of glycidol, such as glycidyl acrylate and glycidyl methacrylate with one or more copolymerizable vinyl compounds. Examples of such copolymers are 1:1 styrene glycidyl methacrylate, 1:1 methyl methacrylate-glycidyl acrylate and a 62.5:24:13.5 methyl methacrylate-ethyl acrylate-glycidyl methacrylate.

Still other epoxy-containing materials are the polyurethane polyepoxides which are obtained by reacting an organic polyisocyanate with a triol or a mixture of a triol and diol to form an isocyanate-terminated polyurethane prepolymer and reacting the prepolymer with a hydroxy aliphatic epoxide compound. Further examples of epoxy-containing materials of this type which can be used in the practice of this invention are described in U.S. Pat. No. 3,445,436, incorporated herein by reference.

The photosensitive aromatic salts used to initiate or catalyze photopolymerization of the organic epoxide are the onium catalysts comprising an aromatic, organic adduct of an aromatic organoatomic cation of a Group Va, VIa, or VIIa atom particularly phosphorous, bismuth, antimony, sulfur, nitrogen, and iodine atoms, and an anion. Aromatic, as used in the description of the groups on the catalysts of the present invention means an aromatic ring (hydrocarbon, or 5, 6 or 7 membered heterocycle comprised of only C, N, S, O, and Se atoms with no more than one atom in the ring selected from S, O, or Se atoms) so attached to the nominative atoms that it is at least as electron withdrawing as benzene. For example, phenacyl

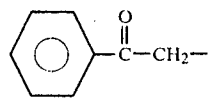

would be a useful aromatic group (being at least as electron withdrawing as benzene), but benzyl

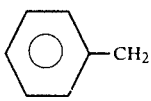

would not be useful because of instability of the compound which would impair storage stability. Representative aromatic rings are phenyl, naphthyl, thienyl, pyranyl, furanyl and pyrazolyl, substituted or not.

For purposes of convenience in describing these onium catalysts, the Group Va, VIa, or VIIa atom that provides the major nomenclature for the adduct (e.g., phosphorous in phosphonium, sulfur in sulfonium, iodine in iodonium, etc.) will be called the nominative atom.

The onium catalysts of the present invention can be represented by the structural formula:

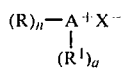

wherein R is an aromatic group at least as electron withdrawing as benzene; $R^1$ is R or alkyl (straight, branched, cyclic or substituted) or alkenyl having 1 to 18 carbon atoms; n is a positive whole integer of at least 1 (preferably 2) up to the valence of A plus one; a is 0 or a positive whole integer of up to the valence of A (preferably A minus 1); n plus a is equal to the valence of A plus one; A is a group Va, VIa, or VIIa atom; and X is an anion, with the proviso that when A is halogen; n is at least 2.

These onium materials are already known in the art. For example, Belgian Pat. Nos. 833,472; 828,668; 828,669; and 838,670 show the use of certain onium compounds as cationic polymerization catalysts for specific monomers such as organosilicon cyclics, vinyl resins, cyclic ethers, cyclic esters, cyclic sulfides, epoxy resins, phenolic resins, polyamines, lactones, styrene, urea/formaldehyde and melamine/formaldehyde resins. Use of these catalysts for silane condensation is described in U.S. Pat. No. 4,101,513. Other organo groups attached to the Group Va, or VIa nominative atom can be the same aromatic group or a substituted or unsubstituted alkyl or cycloalkyl group. The organo groups may also be directly attached one to another via a bond, a methylene group, a —CO— group, an $SO_2$ group, an oxygen, or sulfur or the like. One or more of the organo groups can share two atoms in a condensed ring system.

Examples of suitable onium salts include, but are not limited to:

A. Onium Salts Having a Periodic Group Va Cation
4-acetophenyltriphenylammonium chloride
Diphenylmethylammoniumtetrafluoroborate
Tetra(4-chlorophenyl)phosphonium iodide
Tetraphenylphosphonium iodide
Tetraphenylphosphonium hexafluorophosphate
(4-bromophenyl)triphenylphosphonium hexafluorophosphate
Tetraphenylarsonium tetrafluoroborate
Tetraphenylbismonium chloride
Di-(1-naphthyl)dimethylammonium tetrafluoroborate
Tri-(3-thienyl)methylammonium tetrafluoroborate
Diphenacyldimethylammonium hexafluorophosphate Examples of these and other onium salts and their preparation are disclosed in Belgium Pat. No. 828,668.

B. Onium Salts Having a Periodic Group VIa Cation
Triphenylsulfonium hexafluoroantimonate
4-chlorophenyldiphenylsulfonium tetrafluoroborate
Triphenylsulfonium iodide
4-cyanophenyldiphenylsulfonium iodide
Triphenylsulfonium sulfate
2-Nitrophenylphenylmethylsulfonium sulfate
Triphenylsulfonium acetate
Triphenylsulfonium trichloroacetate
Triphenyl teluronium pentachlorobismutate
Triphenyl selenonium hexafluoroantimonate Examples of these and other onium salts having a Periodic Group VIa cation and their preparation are given in Belgium Pat. Nos. 828,670 and 833,472 and assignee's copending U.S. patent application Ser. No. 609,897, filed Sept. 2, 1975.

C. Onium Salts Having a Periodic Group VIIa Cation.
Diphenyliodonium iodide
4-Chlorophenylphenyliodonium iodide
Diphenyliodonium chloride
4-Trifluoromethylphenylphenyliodonium tetrafluoroborate
Diphenyliodonium sulfate
Di(4-methoxyphenyl)iodonium chloride
Diphenyliodonium trichloroacetate 4-methylphenylphenyliodonium tetrafluoroborate
Diphenylbromonium chloride
1-(2-carboethoxynaphthyl)phenyliodonium chloride
2,2'-Diphenyliodonium hexafluorophosphate Examples of these and other halonium salts and their preparation are disclosed in Belgium Pat. No. 828,669 and assignee's copending U.S. patent application Ser. No. 609,898, filed Sept. 2, 1975.

The preferred latent photocatalytic onium salts for use with the preferred epoxy-containing materials are of two types, viz., the aromatic iodonium and the aromatic sulfonium salts of halogen-containing complex anions and highly fluorinated aliphatic sulfonic and sulfonylic protonic acids. A further description of these preferred onium salts is contained in U.S. Pat. No. 4,101,513, which is incorporated herein by reference.

Suitable examples of the preferred aromatic onium salt photocatalysts include:
diphenyliodonium tetrafluoroborate
diphenyliodonium hexafluorophosphate
diphenyliodonium hexafluoroarsenate
diphenyliodonium hexachloroantimonate
diphenyliodonium hexafluoroantimonate
diphenyliodonium bis(trifluoromethylsulfonyl)methane Other suitable preferred aromatic onium salt photocatalysts are the corresponding triphenylsulfonium salts. Still other preferred salts are listed in assignee's copending Ser. No. 609,898, and include triphenylsulfonium hexafluorophosphate, tritolylsulfonium hexafluorophosphate, methyldiphenylsulfonium tetrafluoroborate, etc.

These onium catalysts are storage stable when anhydrously mixed with the epoxides and are activated by incident radiation in the presence of catalytic amounts of moisture (e.g. atmospheric moisture is sufficient). These catalysts are rapid acting catalysts which generate polymeric sealants with excellent resistance to the contents of liquid crystal cells.

The aromatic iodonium and sulfonium salt photocatalysts useful in the photopolymerizable compositions of the invention are of themselves photosensitive only in the ultraviolet. They, however, are sensitized to the near ultraviolet and the visible range of the spectrum by sensitizers for known photolyzable iodonium and sulfonium compounds, as discussed in U.S. Pat. No. 4,101,513 which is incorporated herein by reference.

The amount of latent photocatalytic onium salt that may be employed in the photopolymerizable compositions of the invention is from about 0.2 to 30 parts per 100 parts of organic material and preferably from about 1 to 7 parts per 100 parts of organic material. While lesser amounts of photocatalyst could be used, excessively long curing times would result. For those compositions wherein a sensitizer is used to make the composition sensitive to radiation in the visible range, about 0.01 to 1.0 parts and preferably about 0.1 to 1.0 parts by weight of sensitizer per part of latent photocatalytic onium salt may be employed. An example of such a sensitizer is 2-ethyl-9,-10-dimethoxy anthracene.

The photopolymerizable sealant compositions of the invention are prepared by simply admixing, under "safe light" conditions, the onium salt and the sensitizer, when used, with the organic material. Solventless compositions are prepared by simply dissolving the aromatic iodonium complex salt and sensitizer in the organic material with or without the use of mold heating.

The sealant compositions of the invention may contain certain additives to alter the properties of the polymerized or cured epoxy resin. Thus, there may be added dyes, pigments, plasticizers, fillers and the like, as long as these materials do not prevent sufficient penetration into the composition by radiation effective for activating the photocatalytic onium salt.

It has been found that the adhesion of the photopolymerizable epoxy-containing sealants described herein to glass and to surfaces treated with an alignment coating of SiO, $TiO_2$ or $SiO_2$ is excellent. However, it has been found that the adhesion can be significantly improved when certain silane compounds are employed as adhesion promoters. This is particularly useful when glass surfaces having fluorocarbon alignment agents are employed, since adhesion of the sealant to these substrates may be unsatisfactory for making a commercially acceptable display unless the adhesion promoter is used.

Adhesion of the sealant to various substrates can be improved by the use of certain silane compounds. For example, the use of glycidoxypropyl triethoxy silane or its precondensate (glycidoxypropyl triethoxy silane heated with dilute hydrochloric acid in order to produce condensation of silane groups), when used as a primer or an additive directly to the sealant, significantly improves adhesion of the sealant to untreated glass plates and glass plates treated with alignment coatings including fluorocarbon alignment coatings.

When used as a primer an alcohol solution of the silane is applied to the substrate and dried. Alternatively the addition of about 0.25 to 30% by weight glycidoxypropyl triethoxy silane or its precondensate to the photopolymerizable epoxy-containing sealant resins achieves the same result (improves adhesion) and eliminates the additional step of coating the glass plates with a primer. Concentration of silane additives over about 30 percent by weight do not further increase bond strength and in fact, when used with some resins, produce sealants with little internal strength. Alternatively, silane concentrations of less than about 0.25% by weight do not noticeably improve adhesion. While a concentration of silane as low as 0.25% by weight is useful, a silane concentration of at least 4 percent by weight is preferred in order for the sealant composition to have a shelf life, under optimum conditions, of about six months.

The presence of catalytic amounts of moisture has been found to be necessary in the initiation of the condensation polymerization of glycidoxypropyl triethoxy silane and its precondensate in the practice of the present invention. Atmospheric moisture will usually be sufficient, but water may be added to the system if desired or if polymerization is needed in the absence of air for any particular application.

A preferred sealant composition comprises mixtures of 55 parts by weight Bisphenol A diglycidyl ether epoxy, 25 parts triglycidyl ether epoxies of trihydroxymethyl propane and 20 parts 3,4-epoxycyclohexylmethyl-3,4-epoxycyclohexene carboxylate with 0.2 to 2.0% by weight photoinitiator, triphenyl sulfonium hexafluorophosphate. To the preferred photopolymerizable sealant, 4–10% by weight glycidoxypropyl triethoxy silane or its precondensate may be added preferably in concentrations of from 4–10% by weight, to improve the adhesion of the resin to the glass plates of the liquid crystal cell.

The following examples will serve to illustrate the present invention. All percentages are given as percentages by weight and all parts are parts by weight of the sealant composition.

EXAMPLES 1-2

Adhesion to glass was determined for three epoxy-containing resins of the present invention. The three tested resins were (a) a mixture of 55 parts by weight Bisphenol A diglycidyl ether epoxy, 25 parts triglycidyl ether epoxies of trihydroxymethyl propane and 20 parts 3,4-epoxycyclohexylmethyl-3,4-epoxycyclohexene carboxylate, (b) Bisphenol A diglycidyl ether sold under the trade name "DER-331" by the Dow Chemical Company and (c) 3,4-epoxycyclohexylmethyl 3,4-epoxycyclohexylcarboxylate sold under the trade name "ERL-4221" by the Union Carbide Corp. Sealant mixtures were prepared with either (1) no adhesion additive, (2) with the adhesion additive, glycidoxypropyl triethoxy silane, sold under the trade name "Z6040" by the Dow Chemical Co. or (3) with the adhesion additive the precondensate of glycidoxypropyl triethoxy silane referred to hereinafter as "Precon." (Table 1). All sealant mixtures contained 4.5% glass beads of 20μ diameter as spacers, and 4.5% $SiO_2$ as flow control agent for easy screen printing. Sealants contained 2% of the photoinitiator triphenyl sulfonium hexafluorophosphate.

The sealant mixtures described in Table 1 were applied along the short sides of metal reinforced glass plates measuring 1 by 3 inches (2.54 by 7.62 cm.) in a 1 by 0.25 inch (2.54 by 0.65 cm) strip. Two glass plates were mated (overlapped) at the sides containing the sealants and radiation cured with a 200 watt/inch mercury vapor lamp at a distance of three inches 7.62 cm.) for about one minute.

The bonds formed were tested by pulling on the glass plates in an overlap sheer-type fashion on an Instron tester using a separation rate of 0.1 inch per minute. Table 1 shows the results of these tests.

gether, cured and tested as in Examples 1 and 2. Table 2 shows the results of these tests.

TABLE 2

| EXAMPLE No. | COMPOSITIONS | | A[1] | | B[2] | |
|---|---|---|---|---|---|---|
| | RESIN | SILANE | "Z6040" | "PRECON" | "Z6040" | "PRECON" |
| 3 | 89.0% | 0% | <60* | <60 | <40 | <40 |
| 4 | 84.7 | 4.3 | 296 | 336 | 360 | 80 |
| 5 | 81.0 | 8 | 280 | 368 | 400 | 212 |
| 6 | 74.0 | 15 | 340 | 452 | 440 | 272 |
| 7 | 68.0 | 21 | 100 | 408 | — | 340 |
| 8 | 63.0 | 26 | 100 | 144 | 520 | 312 |
| 9 | 58.6 | 30.4 | <10 | 60 | 80 | 320 |

*overlap shear strength in lbs/inch[2]
[1]Resin A is Bisphenol A diglycidyl ether
[2]Resin B is a mixture of 55 parts Bisphenol A diglycidyl ether epoxy, 25 parts triglycidyl ether epoxies of trihydroxymethylpropane, and 20 parts 3,4-epoxycyclohexylmethyl-3,4-epoxycyclohexene carboxylate.

A comparison of Example 3 with Examples 4–9 clearly shows the bond strengths are consistently greater when the silane adhesion additives glycidoxypropyl triethoxy silane ("Z6048") and its precondensate ("Precon") are added to the sealants. Silane adhesion additives provide greatest improvement in bond strength when present in a concentration of about 5–15 percent, Example 4, 5 and 6. Concentrations of silane additives over about 30 percent do not further increase

TABLE I

| | COMPOSITIONS | | A[1] | | B[2] | | C[3] | |
|---|---|---|---|---|---|---|---|---|
| EXAMPLE No. | Resin | Silane Adhesion Additive | "Z6040" | "Precon" | "Z6040" | "Precon" | "Z6040" | "Precon" |
| 1 | 89% | 0% | 304* | | 324 | | 284 | |
| 2 | 81 | 0 | 520 | 548 | 380 | 360 | 300 | 295 |

*Overlap shear strength in lbs/inch[2]
[1]Resin A is Bisphenol A diglycidyl ether ("DER 331")
[2]Resin B is a mixture of 55 parts by weight Bisphenol A diglycidyl ether epoxy, 25 parts triglycidyl ether epoxies of trihydroxymethyl propane and 20 parts 3,4-epoxy cyclohexylmethyl-3,4-epoxy cyclohexene carboxylate.
[3]Resin C is 3,4-epoxy cyclohexylmethyl 3,4-epoxy cyclohexylcarboxylate ("ERL-4221")

Table 1 clearly shows that bond strengths are consistently greater when the adhesion additives glycidoxypropyl triethoxy silane ("Z6040") and its precondensate ("Precon") are added to the epoxy-containing resin sealants.

EXAMPLES 3–9

Adhesion to glass coated with a fluorocarbon alignment agent was tested for two epoxy-containing resins of the present invention. The two tested resins were (a) a mixture of 55 parts Bisphenol A diglycidyl ether epoxy, 25 parts triglycidyl ether epoxies of trihydroxymethyl propane and 20 parts 3,4-epoxycyclohexylmethyl-3,4-epoxycyclohexene carboxylate, and (b) Bisphenol A diglycidyl ether ("DER 331"). Sealant mixtures were prepared with varying amounts of epoxy-containing resin and varying amounts of an adhesion additive, either "Z6040" or "Precon." (Table 1). To the sealants 2% by weight of photocatalytic initiator triphenyl sulfonium hexafluorophosphate was added. All sealant mixtures also contained 4.5% glass beads of 20μ diameter as spacers, and 4.5% $SiO_2$ flow control agent for easy screen printing.

The sealant mixture described in Table 2 were applied to 1 by 3 inch (2.54 by 7.62 cm) glass plates that had been pretreated with a fluorocarbon alignment agent (a copolymer of chlorotrifluoroethylene and vinylidene fluoride). The glass plates were sealed tobond strength and in fact, when used with some resins, produce sealants with little internal strength, See Example 9. A comparison of Example 1 with Example 3 shows that when the glass plates are not coated with the fluorocarbon alignment agent, bonds of sufficient strength can be obtained even without the addition of silane adhesion additives, "Z6040" or "Precon." However, when the glass plates are coated with a fluorocarbon alignment agent, such as a copolymer of chlorotrifluoroethylene and vinylidene fluoride, either "Z6040" or "Precon" must be present in order for the sealant to bond sufficiently well to the glass plates to provide a satisfactory liquid crystal display cell.

EXAMPLE 10

Liquid crystal display cells were made according to the present invention using a mixture of 55 parts Bisphenol A diglycidyl ether epoxy, 25 parts triglycidyl ether epoxies of trihydroxymethyl propane and 20 parts 3,4-epoxycyclohexylmethyl-3,4-epoxycyclohexene carboxylate as the epoxy-containing sealant resin. All sealant mixtures contained 4.5% $SiO_2$ flow control agent, 4.5% glass beads of 20μ diameter and 2.0% triphenyl sulfonium hexafluorophosphate as photocatalytic initiator. All glass plates (cell halves) were coated with a copolymer of chlorotrifluoroethylene and vinylidene fluoride, a fluorocarbon alignment agent. One set of sealants contained 89% resin and no silane adhesion additives ("Z6040" or "Precon"). Another set of sealants contained 81% resin and 8% "Z6040." The glass plates were mated and the resulting cells were subjected to radiation as in Examples 1-9, to cure the photopolymerizable sealants. The sealed liquid crystal cells were filled with a commercially available liquid crystal mixture of three phenylcyclohexanes and one biphenylcyclohexene (available commercially under the trade designation nematic phase 1132 TNC "Licristal" from C.M. Laboratories, Inc.) plugged with a polyester frit, covered with room temperature curing epoxy, and placed in an oven at 92° C. for over 500 hours. The DC current through the cells was measured throughout heating in order to determine the stability of the cells. The current density of the cells after 500 hours at 92° C. and under 5 DC volts was calculated to be 0.083 uA/cm$^2$. This current density is well within the limits generally required. Thus, after 500 hours at 92° C. the liquid crystal display cells are still functioning satisfactorily. The results indicate that the sealants of the present invention are stable and compatible with liquid crystal materials containing phenylcyclohexane.

EXAMPLE 11

Liquid crystal display cells made according to Example 10 were tested for high humidity stability. The cells were sealed, cured and filled with the liquid crystal materials of Example 10. After storage for 2055 hours at 45° C. and 95% relative humidity, the cells exhibited no change in optical transmission or contrast ratio.

What is claimed is:

1. A photopolymerizable, adhesive, sealant composition comprising:
   (a) cationically polymerizable epoxide with a functionality of at least 1, and
   (b) an organic aromatic onium catalyst comprising an aromatic adduct of
      (1) a diaromatic, triaromatic, or tetraaromatic organoatomic cation of a Group Va, VIa, or VIIa atom and
      (2) an anion;
   said onium catalyst being represented by the formula:

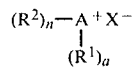

wherein
   R$^2$ is an aromatic group at least as electron withdrawing as benzene,
   R$^1$ is an alkyl or alkenyl group,
   A is a Group Va, VIa, or VIIa atom,
   X is an anion,
   n is a positive whole integer of at least 2 up to the valence of A plus one,
   a is 0 or a positive whole integer up to the valence of A minus one, and
   n plus a is equal to the valence of A plus one and wherein at least two of said R$^2$ groups are bonded to A, and
   (c) an adhesion-aiding amount of glycidoxypropyl triethoxy silane or its precondensate.

2. A photopolymerizable composition in accordance with claim 1, wherein said adhesion-aiding amount of glycidoxypropyl triethoxy silane or its precondensate is about 0.25–30% by weight of said photopolymerizable composition.

3. The photopolymerizable composition of claim 1 wherein said Group Va, VIa, or VIIa atom is selected from the group consisting essentially of phosphorous, bismuth, sulfur, nitrogen, iodine, antimony and mixtures thereof.

4. The photopolymerizable composition of claim 1 wherein said anion is selected from the group consisting of tetrafluoroborate, hexafluorophosphate, hexafluoroarsenate, hexachloroantimonate, bis(perfluoroalkylsulfonyl)methane, iodide, bromide, chloride, fluoride, sulfate, acetate, trichloroacetate and mixtures thereof.

5. A photopolymerizable composition in accordance with claim 1, wherein said cationically polymerizable epoxide is selected from the group consisting of epichlorohydrins, alkylene oxides, alkenyl oxides, glycidyl esters, glycidyl ethers, epoxy novolaks, copolymers or acrylic acid esters of glycidol and copolymerizable vinyl compounds, polyurethane polyepoxides and mixtures thereof.

6. A photopolymerizable composition in accordance with claim 1, wherein said cationically polymerizable epoxide is selected from the group consisting of:
   (a) a mixture of Bisphenol A diglycidyl ether epoxy, triglycidyl ether epoxies of trihydroxymethyl propane, and 3,4-epoxycyclohexylmethyl-3,4-epoxycyclohexene carboxylate;
   (b) 3,4-epoxycyclohexylmethyl 3,4-epoxycyclohexylcarboxylate; and
   (c) Bisphenol A diglycidyl ether;
and wherein said organic aromatic onium catalyst is triphenyl sulfonium hexafluorophosphate.

7. A photopolymerizable, adhesive sealant composition comprising:
   (a) a mixture of Bisphenol A diglycidyl ether epoxy, triglycidyl ether epoxies of trihydroxymethyl propane, and 3,4-epoxycylohexylmethyl-3,4-epoxycyclohexene carboxylate;
   (b) An organic aromatic onium catalyst comprising an aromatic adduct
      (1) a diaromatic, triaromatic, or tetraaromatic organoatomic cation of a Group Va, VIa, or VIIa atom and
      (2) an anion;
   said onium catalyst being represented by the formula:

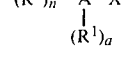

wherein R$^2$ is an aromatic group at least as electron withdrawing as benzene, R$^1$ is an alkyl or alkenyl group A is a Group Va, VIa, or VIIa atom, X is an anion, n is a positive whole integer of at least 2 up to the valence of A plus one, a is 0 or a positive whole integer up to the valence of A minus one, and n plus a is equal to the valence of A plus one and wherein at least two of said R$^2$ groups are bonded to A; and
   (c) an adhesion-aiding amount of glycidoxypropyl triethoxy silane or its precondensate.

* * * * *